Figure 2B:
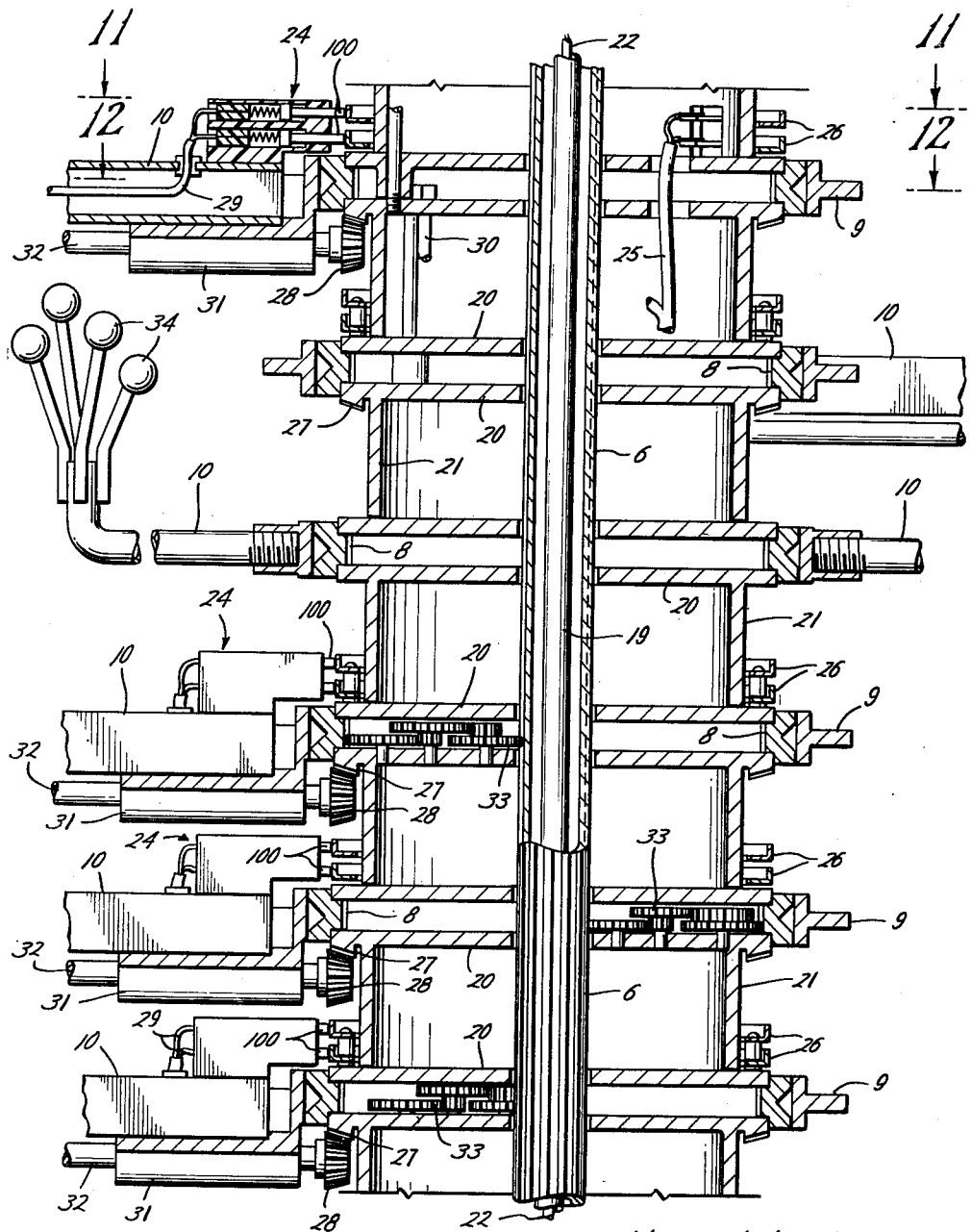

April 17, 1962 H. VERSON 3,029,528
SOLAR SYSTEM MECHANISM
Filed March 6, 1961 6 Sheets-Sheet 1
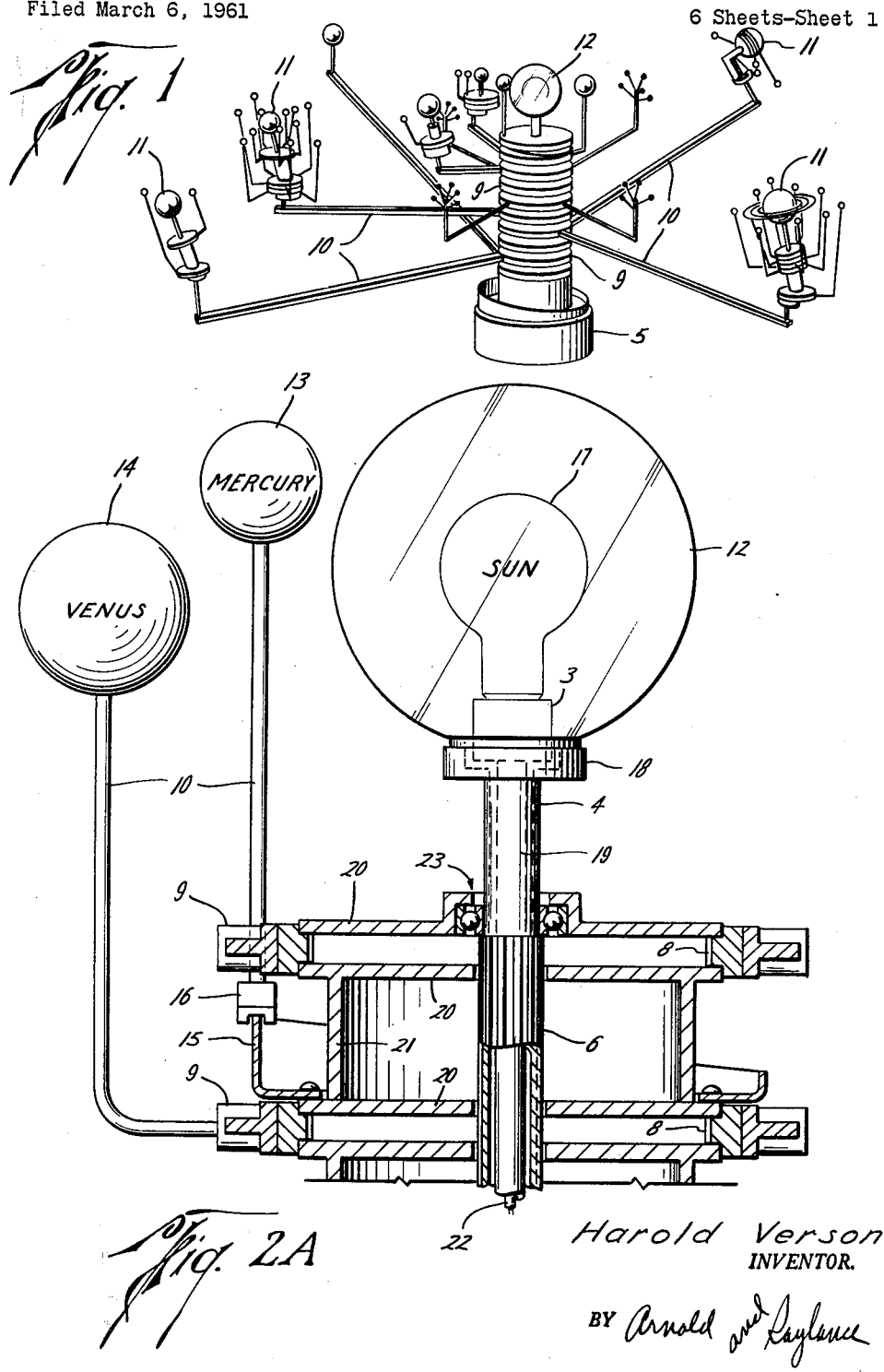
Harold Verson
INVENTOR.
BY Arnold and Laylance
ATTORNEY Harold Verson
INVENTOR.

April 17, 1962     H. VERSON     3,029,528
SOLAR SYSTEM MECHANISM
Filed March 6, 1961     6 Sheets-Sheet 3
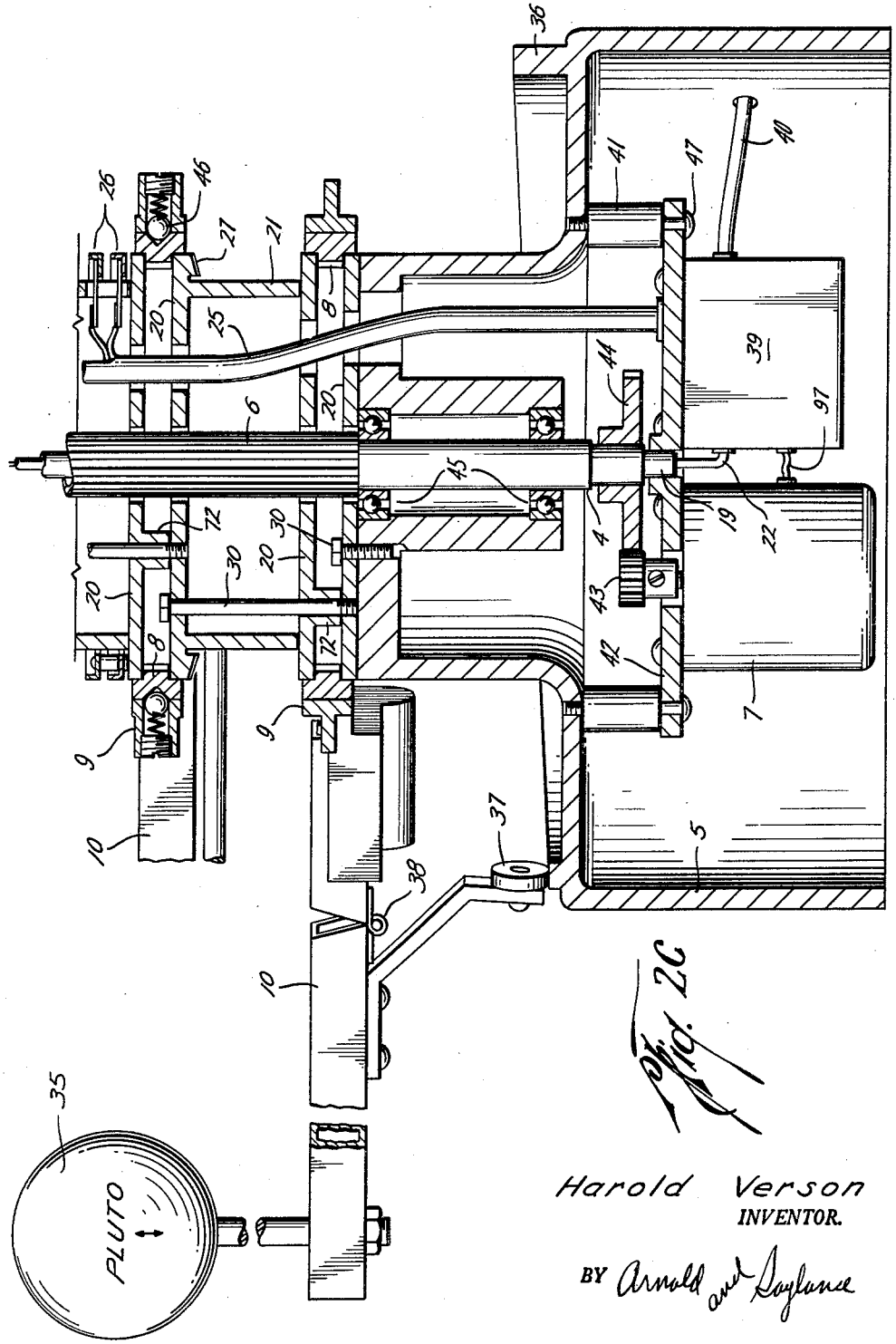
Harold Verson
INVENTOR.
ATTORNEY

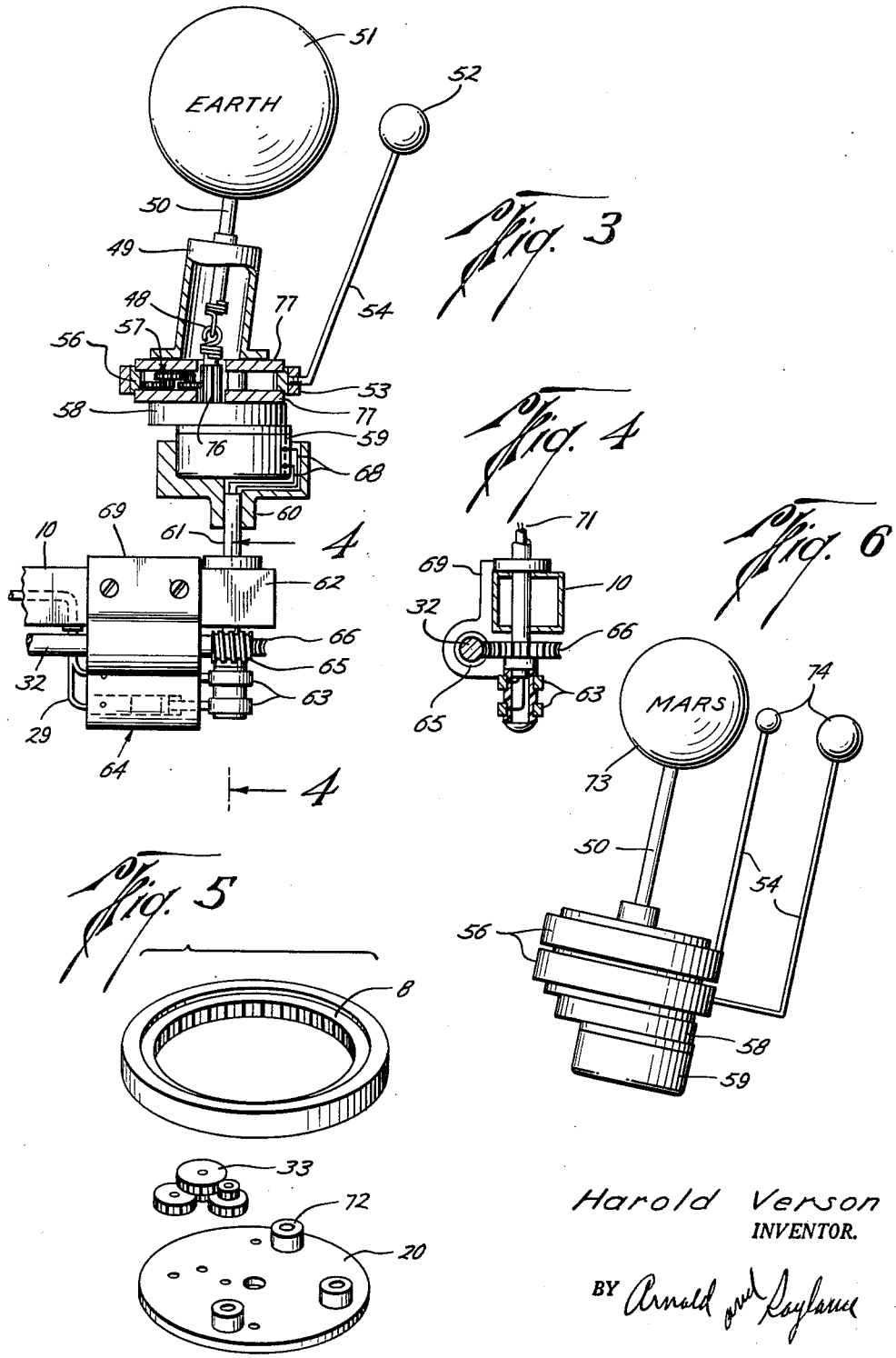

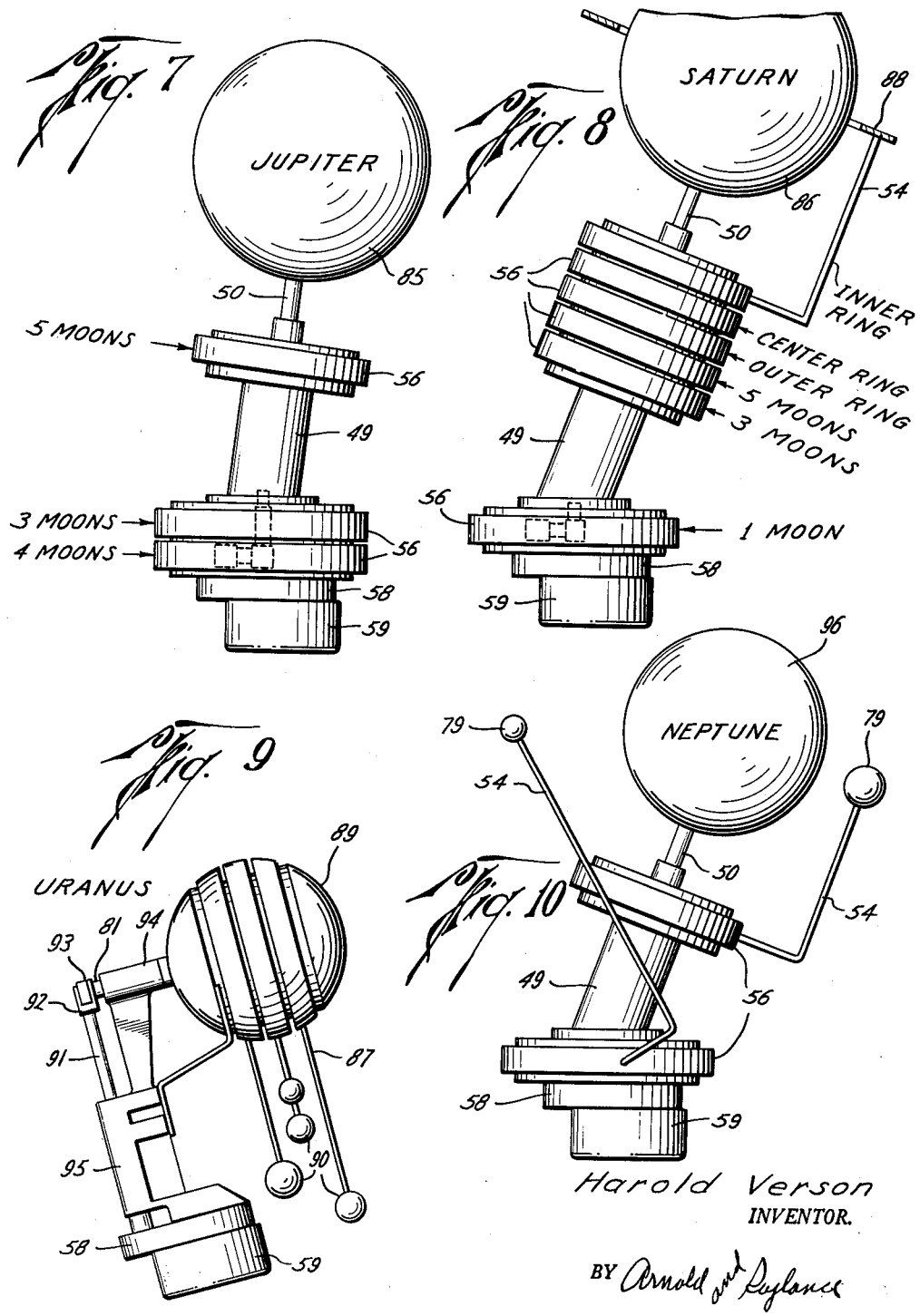

April 17, 1962     H. VERSON     3,029,528
SOLAR SYSTEM MECHANISM
Filed March 6, 1961     6 Sheets-Sheet 6
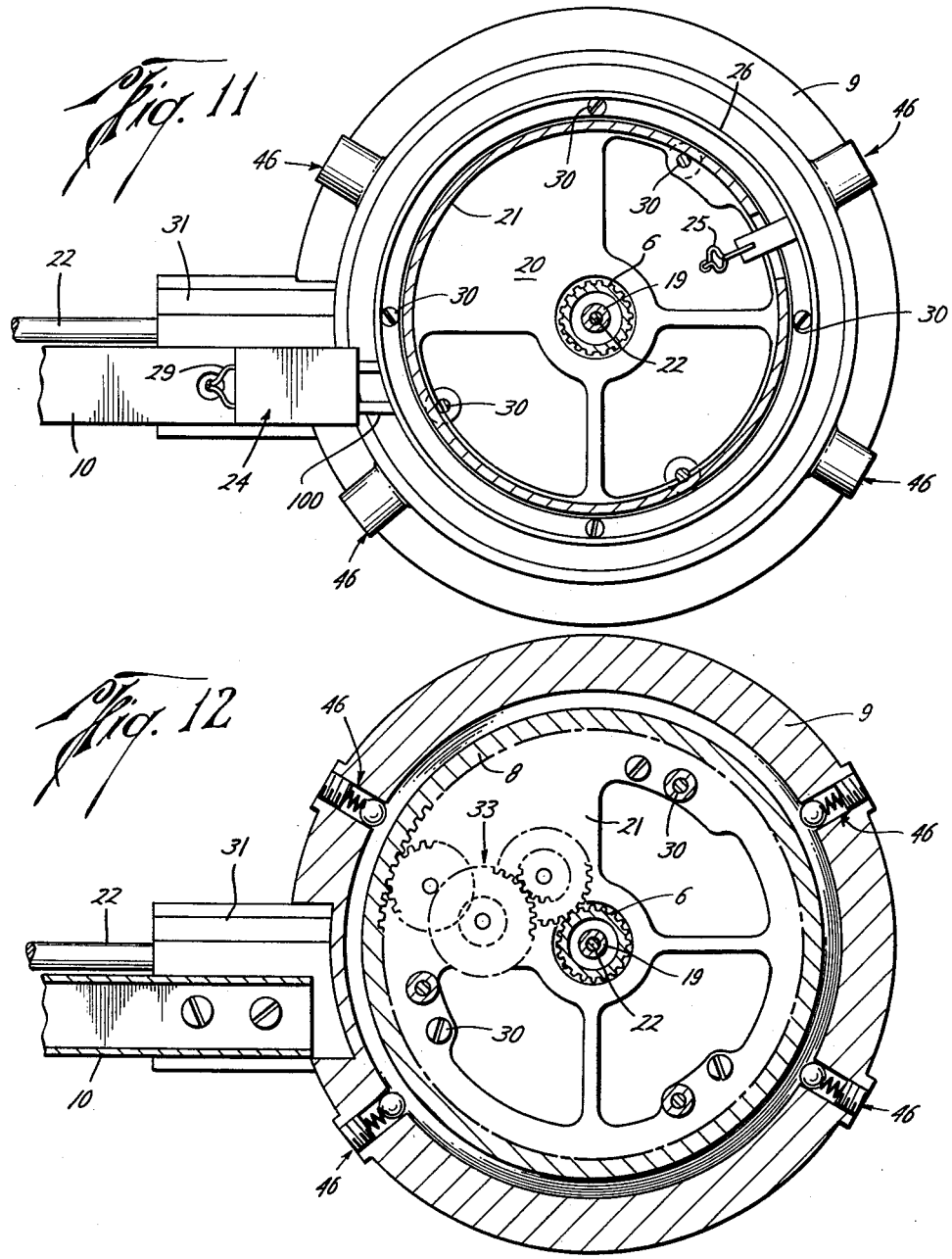
Harold Verson
INVENTOR.
BY Arnold and Roylance
ATTORNEY

United States Patent Office 3,029,528
Patented Apr. 17, 1962

3,029,528
SOLAR SYSTEM MECHANISM
Harold Verson, 3626 Aberdeen, Houston, Tex.
Filed Mar. 6, 1961, Ser. No. 93,467
6 Claims. (Cl. 35—45)

This invention relates to a planetarium and is particularly concerned with a manipulative planetarium structure adapted for use as an educational tool.

It is an object of this invention to provide an educational device for demonstrating, illustratively, various relationships of location and movement of the sun, planets orbiting the sun and moons and asteroids orbiting certain planets.

A further object of the present invention is to provide means for driving models of various members of the solar system in illustrative planetary relation.

Another object of the invention is to provide driving means for such a device, which driving means will accommodate manual movement of the panetary model either concurrently with or independently of driven movement.

Other objects and advantages, though not enumerated as such, are also provided by the present invention. Several of these other objects and advantages will be made apparent by the following general and detailed description of the one embodiment thereof which has been illustrated in the accompanying drawings.

In general, that embodiment of the present invention which is illustrated in the accompanying drawings comprises a base 5 supporting a model sun 12 and an upstanding pinion shaft 6 each of which is independently driven by an electric motor 7. A series of "stacked" internal ring gears 8, are then concentrically disposed around and drivably engage pinion 6 by means of gear trains 33. Gears 8 then drivably carry slip rings 9 which carry elongated supports 10 and model planetary assemblies 11. In turn, some of model planetary assemblies 11 are provided with an upstanding and independently driven pinio nand ring gear assembly of reduced scale for axial rotation of the model planet and carriage and orbital movement of moons and the like, while others are directly secured to supports 10.

In the drawings:
FIGURE 1 is a perspective view.
FIGURE 2A is a front view, partly in elevation and partly in section, of the upper portion of the device.
FIGURE 2B is a front view, partly in elevation and partly in section of the intermediate portion of the device.
FIGURE 2C is a front view, partly in elevation and partly in section of the lower portion of the device.
FIGURE 3 is a side view, partly in elevation and partly in section of the model planet earth and the assembly employed for its carriage and movement.
FIGURE 4 is a section taken along line 4—4 of FIGURE 3.
FIGURE 5 is an exploded perspective view of a typical ring gear assembly.
FIGURE 6 is a side elevation of the model planet Mars and its drive and carriage assembly.
FIGURE 7 is a side elevation of the model planet Jupiter and its drive and carriage assembly.
FIGURE 8 is a side elevation of the model planet Saturn and its drive and carriage assembly.
FIGURE 9 is a side elevation of the model planet Uranus and its drive and carriage assembly.
FIGURE 10 is a side elevation of the model planet Neptune and its drive and carriage assembly.
FIGURE 11 is a section taken along line 11—11 of FIGURE 2B.
FIGURE 12 is a section taken along line 12—12 of FIGURE 2B.

In the drawings, like reference numerals have been employed to indicate like parts as follows:

1. Not used
2. Not used
3. Socket assembly
4. End portions
5. Base
6. Pinion
7. Electric motor
8. Gears
9. Rings
10. Supports
11. Planetary assemblies
12. Sun
13. Mercury
14. Venus
15. Cam
16. Cam follower
17. Light bulb
18. Flange
19. Conduit
20. Plates
21. Rings
22. Conductor
23. Bearing assembly
24. Contact assembly
25. Conductor
26. Contacts
27. Rack
28. Bevel gear
29. Conductor
30. Stud bolts
31. Housing
32. Shaft
33. Gear trains
34. Asteroid belt
35. Pluto
36. Cam
37. Cam follower
38. Hinged assembly
39. Junction box
40. Conductor
41. Spacing collar
42. Plate
43. Drive shaft gear
44. Spur gear
45. Bearings
46. Spring loaded bearing assemblies
47. Bolts
48. Eyes
49. Housing
50. Shaft
51. Earth
52. Moon
53. Not used
54. Supports
55. Not used
56. Ring gear
57. Gear train
58. Gear box
59. Electric motor
60. Mount
61. Shaft
62. Not used
63. Slip rings
64. Not used
65. Worm gear
66. Gear
67. Not used
68. Conductor
69. Housing
70. Not used
71. Not used
72. Stud bolt collars
73. Mars
74. Moon
75. Not Used
76. Pinion
77. Spaced plates
78. Not used
79. Moons
80. Not used
81. Shaft
82. Not used
83. Not used
84. Not used
85. Jupiter
86. Saturn
87. Not used
88. Rings
89. Uranus
90. Moons
91. Shaft
92. Worm gear
93. Gear
94. Frame
95. Housing
96. Neptune
97. Not used
98. Not used
99. Not used
100. Contacts In the illustrated embodiment, a base 5 conveniently carries an electric motor 7 by means of plate 42 which is secured to base 5 by means of bolts 47 and spacing collars 41. Plate 42 also carries a junction box 39 and an upstanding conduit 19. An elongated pinion 6, having smooth surface end portions 4 is likewise carried by base 5 in upstanding position and is adapted for rotation around conduit 19 by means of bearings 45. At the lower terminal end of portion 4 of pinion 6 there is provided a spur gear 44 which drivably engages drive shaft gear 43 of motor 7 to provide for driven rotation of pinion 6 when motor 7 is energized.

The upper end portion 4 of pinion 6 terminates in a flanged pedestal member 18 which carries a translucent spherical member 12 which spherical member is representative of the sun. Thus rotation of pinion 6 will rotate model sun 12 about its vertical axis.

Illustrative illumination of model sun 12 is conveniently provided by outfitting the upper terminal end of conduit 19 with a socket assembly 3 and an electric light bulb 17. To provide current to bulb 17 a conductor 22, connected to socket assembly 3, passes down through conduit 19 and into junction box 39 which in turn receives current from any convenient source through conductor 40.

Concentrically surrounding pinion 6 is a "stack" of internal ring gears 8 each of which is rotatably carried between a pair of plates 20. Plates 20 which also concentrically surround pinion 6, are secured to base 5, and in turn to each other by means of stud bolts 30. Each of the paired plates 20 is conveniently spaced by means of stud bolt collars 72 which may if desired be conveniently formed as an integral part of plates 20, and each pair of plates 20 is then conveniently spaced by means of spacer rings 21 which may also be integrally formed with plates 20. Since pinion 6 passes axially through "stacked" plates 20 but does not engage any of them, the uppermost plate 20 is provided with bearing assembly 23, which bearing assembly engages upper portion 4 of pinion 6 to facilitate upstanding rotatable support of pinion 6 in cooperation with bearings 45 of base 5.

Thus assembled, each pair of ring gear carrying plates 20 conveniently serves to house a gear train 33 which gear train serves to independently drivably connect each of gears 8 to pinion 6. Accordingly, when pinion 6 is rotated, that rotation will drive each gear train 33 and in turn, each gear 8. Moreover, because of this "stacked" arrangement, which permits independent engagement of each of gears 8 with pinion 6, any desired gear ratio may be employed between pinion 6 and any one of gears 8.

Surrounding the outer face of each of gears 8, and drivably carried thereby, is a slip ring 9. As shown in FIGURE 2C, and again in FIGURE 12, rings 9 are adapted to fit relatively tightly over gears 8. Thus the two are sufficiently frictionally engaged that rings 9 will normally rotate along with gears 8. However, it will also be noted that each of gears 8 is circumferentially slotted to receive the spring loaded ball member of bearing assemblies 46 of rings 9. Thus, while rings 9 will normally rotate with gears 8, it is made conveniently possible to arrest the rotation of rings 9, for realignment or otherwise, while gears 8 continue to turn therewithin.

Rings 9 then carry, as by clamping or otherwise, a plurality of elongated support members 10, which members are of various shapes and sizes. In turn, each of supports 10 carries a model planet, and in some instances also carries model moons and an assembly for orbiting the moons about their planet and for rotation of the planet about its axis, which axis is, in some instances, disposed at an inclined angle. Thus, as motor 7 rotates pinion 6 and sun 12, pinion 6 will drive each of gear trains 33 to rotate gears 8, rings 9, supports 10, and planets 11 which planets, by predetermined selection of the gear ratio in gear trains 33 and the shape and size of supports 10, will orbit sun 12 in illustrative planetary relation. Moreover, if it is desired to re-orient any of planets 11 in relation to any other planet 11, or to arrest orbital movement of any of planets 11 while continuing orbital movement of any other planet, slip rings 9 will permit it to be done.

While orbital movement of some planets defines a plane which is parallel to the equatorial plane of the sun, Mercury and Pluto define a plane which is angulated with respect to the sun's equatorial plane. Accordingly, that one of supports 10 that carries planet Mercury is passed slidably through ring 9 to terminate in a cam follower 16 which engages a cam 15, which cam is conveniently secured to the peripheral edge portion to one of plates 20 as by bolting. Thus as Mercury, model planet 13, is orbitally moved about the sun it will ride cam 15 to rise and fall therewith and thereby define, illustratively, its angulated orbital path. Likewise, the support 10 that carries Pluto, model planet 35, is adapted to carry Pluto through its angulated orbit by the provision of a hinged assembly 38 on the horizontal of support 10, a cam follower 37, and a cam 36 which latter cam is conveniently carried by the outer edge portion of base 5. However, other orbiting bodies, such as Venus, model planet 14, an asteroid belt 34 rotate in a horizontal plane and present no problem. These latter bodies may therefore be directly secured to the terminal end of their respective supports 10.

Certain planets, as for example earth, in addition to orbiting the sun, rotate about an inclined axis. To provide for maintenance of the relationship between the inclined axis of these planets and the vertical axis of the sun, as these planets orbit the sun, each of the supports 10 which carry these planets also carries a worm gear assembly adapted to keep the planets axis of rotation properly oriented. As shown particularly in FIGURES 2B, 3 and 4, one end of a shaft 32 is journaled in housing 31 of support 10 and terminates in a bevel gear 28 which drivably engages a rack 27 provided circumferentially around the underside of the peripheral edge portion of corresponding plate 20. The opposite end of shaft 32 is then journaled in housing 69 of support 10 to terminate in a worm gear 65. A shaft 61 then extends through the end of support 10 adjacent worm 65 and at right angles thereto to carry a worm engaging gear 66. At the upper end of shaft 61 there is a mount 60 which serves to carry earth 51, moon 52 and the driving and carriage assembly therefor. Thus, as support 10 is swung around the sun by the rotation of ring 9, rack 27 will rotate bevel gear 28, shaft 32 and worm 66 which will turn gear 66, shaft 61 and mount 60 thereby maintaining proper orientation of the earth's inclined axis of rotation relative to the sun's vertical axis of rotation. Moreover, as will be noted by reference to the drawings, particularly the above mentioned figures thereof, this same mechanism will provide proper orientation of the axes of those other planets which rotate about an inclined axis.

To provide for rotation of the model planet earth 51 about its axis and for orbital movement of its moon, a mount 60 carries a small electric motor 59 which, in turn, carries, and drivably engages, a gear box 58 and an upstanding pinion 76. Pinion 76 is in turn surrounded by a pair of spaced plates 77 which houses a gear train 57 and carries an internal ring gear 56 which is driven by pinion 76 through gear train 57. In turn, gear 56 carries an elongated support member 54 which extends outwardly therefrom to carry a moon 52 for illustrative orbital movement about earth 51. To provide for rotation of earth 51 about its inclined axis, a shaft 50, which carries earth 51, is journaled in housing 49 which is carried by upper plate 77. Shaft 50 then extends into housing 49 to terminate in spaced relation to the upper terminal end of pinion 76. The ends of shaft 50 and pinion 76 are then conveniently connected by a universal joint which may be conveniently provided by a pair of interengaging eyes 48, as shown, or by a simple flexible coupling or otherwise.

As shown in FIGURE 6 the planet Mars 73 is also carried on a shaft 50 driven by motor 59 through gear box 58 and a pinion member which also drives gears 56 to orbit moons 74 carried on supports 54. In this instance however, shaft 50 can be integral with or directly connected to the pinion thereby obviating the need for a universal joint.

Referring to FIGURES 7, 8 and 10 it will be seen that the planets Jupiter 85, Saturn 86, and Neptune 96 in the same manner as the planet earth and with the added provision of moons 79 and/or rings 88 which are conveniently driven by a pinion gear portion of shaft 50.

In the case of the model planet Uranus 89, which is unique in that it rotates about an axis inclined to substantially horizontal, and is orbited by moons 90 which move about the same axis, a somewhat different structure is provided. Here, a shaft 91 is journaled in housing 95 of frame 94 which frame is conveniently secured to gear box 58 to provide carriage for Uranus 89. One end of shaft 91 drivably engages the gear train in box 58 and the other end terminates in a worm gear 92 which drives gear 93 or shaft 81 to rotate Uranus about its axis. Within the body of Uranus shaft 81 terminates in a pinion portion which serves to drive moons 90 through an internal ring gear assembly such as that here-in-above described.

To drive motors 59, a conductor 25 extends out of junction box 39 and up through "stacked" plates 20 to contacts 26 which pass around spacer rings 21 to be contacted by spring loaded contacts 100 of contact assembly 24. Contact assembly 24 is then connected to a conductor 29 which in turn contacts slip rings 63 which are carried by shafts 61 and which connect with conductors 68 and in turn with motors 59.

From the foregoing general and detailed description of but one embodiment of this invention it may be seen that devices embodying the invention, which invention will just as successfully admit of various other embodiments, provide the art with many advantages. For example, devices embodying the invention are, relative to prior such devices, mechanical and structurally simple and compact. Further, devices embodying the invention permit the instructor, or other user, to easily rearrange the relationship of various planets to illustrate significant points of itnerest which might not otherwise be easily understood. Beyond these advantages it is noteworthy that the "slip ring feature" obviates the necessity for waiting-out any given moment to arrive at a predetermined planetary relationship as well as permitting compact storage and transportation of the device by the simple operation of swinging all of supports 10 and their respective planets into vertical alignment where they may be secured until the device is used. For these and other reasons it is believed that devices embodying the present invention provide a significant advance in the art.

What is claimed is:

1. In a planetarium, the combination of;
an elongated driven member; means supporting said member in upstanding position;
a plurality of internal ring gears; means supporting said gears in spaced relation to each other and in concentric relation to said member;
means independently drivably engaging each said gear with said member;
a slip ring drivably carried by each said gear; and a plurality of bodies representative of various planets carried by said slip rings for movement in illustrative planetary relation.

2. In a planetarium, the combination of;
an elongated driven member; means supporting said member in upstanding position;
a plurality of internal ring gears; means supporting said gears in spaced relation to each other and in concentric relation to said member;
means drivably connecting each of said gears to said member, said means being adapted to permit simultaneous rotation of said gears at independent speeds, upon rotation of said member;
a slip ring carried by and frictionally engaging the outer face of each of said gears;
a plurality of bodies representative of various planets;
a plurality of elongated support members carried by said rings and extending outwardly therefrom to support said bodies in illustrative planetary relation;
and means for independently rotating various of said bodies about their respective axes.

3. In a planetarium, the combination of;
an elongated driven member; means supporting said driven member in upstanding position;
a spherical member representative of the sun, said spherical member being carried by said supporting means and disposed above said driven member;
a plurality of internal ring gears; means supporting said gears in spaced relation to each other and in concentric relation to said driven member;
means independently drivably engaging each said gear with said driven member;
a slip ring carried by each of said gears; a plurality of bodies representative of various planets;
a plurality of elongated support members carried by said slip rings and extending outwardly therefrom to support said bodies for movement in illustrative planetary relation to said spherical member;
and means for independently rotating various of said bodies about their respective axes.

4. In a planetarium, the combination of;
an elongated driven member; means supporting said driven member in upstanding position;
a plurality of internal ring gears; means supporting said gears in spaced relation to each other and in concentric relation to said driven member;
means independently drivably engaging each said gear with said driven member;
a spherical member representative of the sun disposed adjacent said driven member;
a slip ring drivably carried by each said gear; yieldable support members extending outwardly from said rings for supporting a plurality of bodies representative of various planets for movement, when said rings are driven, in illustrative planetary relation to said spherical member;
and means slidably engaging at least one of said yieldable members to effect angulation, relative to the equatorial plane of said spherical member, of the orbital plane of a body carried by said yieldable member.

5. In a planetarium, the combination of;
an elongated driven member supported in upstanding position;
a plurality of internal ring gears disposed in spaced relation to each other and in concentric relation to said driven member;
means independently drivably engaging each said gear with said driven member;
a spherical member disposed above said driven member and representative of the sun;
a slip ring drivably carried by each said gear; a plurality of bodies representative of various planets and carried by said rings for movement in illustrative planetary relation to said spherical member, at least one of said bodies being rotatable about an inclined axis;
and worm gear means associated with at least one said rotatable body and driven by one of said gears, whereby the inclined axis of said body will define a cylindrical path as said body orbits said spherical member.

6. In a planetarium, the combination of;
a first elongated driven member supported in upstanding position;
a spherical member disposed above said first driven member and representative of the sun;
a plurality of internal ring gears disposed in spaced relation to each other and in concentric relation to said first driven member;
means independently drivably connecting each of said first mentioned gears to said first driven member;
a slip ring drivably carried by each of said first mentioned gears;
at least one elongated support member carried by said first mentioned slip rings and extending outwardly therefrom to carry a second upstanding driven member;

a first body disposed over said second driven member, said first body being representative of one of the planets and adapted to be carried in illustrative orbital movement about said spherical member by said support member;

at least one internal ring gear surrounding said second driven member and disposed in concentric relation thereto;

means drivably engaging said second driven member and said last mentioned gear;

a slip ring drivably carried by said last mentioned gear;

and a second body representative of a moon, said second body being carried by said last mentioned ring for illustrative orbital movement about said second body.

References Cited in the file of this patent

UNITED STATES PATENTS 2,226,032   Wahlberg _____ Dec. 24, 1940